(12) United States Patent
Ishida

(10) Patent No.: US 6,918,688 B2
(45) Date of Patent: Jul. 19, 2005

(54) VEHICLE HEADLAMP APPARATUS

(75) Inventor: Tetsuya Ishida, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 66 days.

(21) Appl. No.: 10/699,169

(22) Filed: Oct. 31, 2003

(65) Prior Publication Data

US 2004/0090788 A1 May 13, 2004

(30) Foreign Application Priority Data

Nov. 5, 2002 (JP) ..................................... P.2002-320603

(51) Int. Cl.$^7$ .............................................. F21V 17/02
(52) U.S. Cl. ........................ 362/467; 362/513; 362/526
(58) Field of Search ................................. 362/467, 513, 362/526, 44, 53; 318/264–267, 286, 466–470, 432–434, 903

(56) References Cited

U.S. PATENT DOCUMENTS

2002/0064051 A1 * 5/2002 Sugimoto et al. ........... 362/467

FOREIGN PATENT DOCUMENTS

JP 2002-160581 6/2002

* cited by examiner

Primary Examiner—Sandra O'Shea
Assistant Examiner—Mark Tsidulko
(74) Attorney, Agent, or Firm—Fish & Richardson P.C.

(57) ABSTRACT

A vehicle headlamp device contains a rotation-state recognizing circuit operating such that when any of Hall elements used for controlling a rotational position of a drive motor for deflecting the optical axes in a headlamp device is abnormal, a rotation-state recognizing circuit recognizes a rotational position of the drive motor based on the output signals of the remaining Hall elements and a predetermined angle prediction time computed using a rotational period of the drive motor. With provision of the rotation-state recognizing circuit, even when any of the Hall elements becomes defective, the rotation of the drive motor is normally controlled to thereby secure a proper optical-axis deflection control in the headlamp device.

8 Claims, 14 Drawing Sheets

FIG. 13A

| ROTATIONAL POSITION | HALL ELEMENT | | | CODE VALUE (HEXADECIMAL) |
|---|---|---|---|---|
| | H1 | H2 | H3 | |
| PS1 | 1 | 0 | 1 | 5 |
| PS2 | 0 | 0 | 1 | 1 |
| PS3 | 0 | 1 | 1 | 3 |
| PS4 | 0 | 1 | 0 | 2 |
| PS5 | 1 | 1 | 0 | 6 |
| PS6 | 1 | 0 | 0 | 4 |

FIG. 13B

| ROTATIONAL POSITION | HALL ELEMENT | | | CODE VALUE (HEXADECIMAL) |
|---|---|---|---|---|
| | H1 | H2 | H3 | |
| PS1 | 1 | 0 | 1 | 5 |
| PS2 | 1* | 0 | 1 | 5 |
| PS3 | 1* | 1 | 1 | 7 |
| PS4 | 1* | 1 | 0 | 6 |
| PS5 | 1 | 1 | 0 | 6 |
| PS6 | 1 | 0 | 0 | 4 |

* : ERROR OUTPUT

VEHICLE HEADLAMP APPARATUS

BACKGROUND OF THE INVENTION

The present invention relates to a headlamp device for a vehicle, such as an automobile, in which an illumination optical axis is deflected by using a motor as a drive source. More particularly, the invention relates to a vehicular headlamp device well adaptable for a headlamp device which uses headlamps each provided with light distribution control means, for example, an AFS (adaptive front lighting system), for causing an illumination direction and an illumination range of the headlamp to change in accordance with a running state of the vehicle.

A technique described in U.S. Published patent application 2002-0064051 A1 (published on May 30, 2002) may be presented as an example of the AFS proposed as a technique for improving the running safety of the automobile. As shown in a conceptual diagram of FIG. 1, the AFS detects information representative of a running state of an automobile CAR by use of sensors 1, and outputs detecting output signals of the sensors to an ECU (electronic control unit) 2. Those sensors 1 are a steering sensor 1A, a speed sensor 1B, and car height sensors 1C. The steering sensor 1A detects a steering angle of a steering wheel SW of the automobile CAR, for example. The speed sensor 1B detects a speed of the automobile CAR. The car height sensors 1C detects heights of the front and the rear axles for detecting a leveling of the automobile CAR (only the vehicle height sensor attached to the rear axle is illustrated in the figure). Those sensors 1A, 1B and 1C are connected to the ECU 2. The ECU 2 receives output signals from the sensors 1, and controls swivel lamps 3R and 3L installed on the right and left locations of the front of the automobile in accordance with the received output signals. The swivel lamps are headlamps of which the light distribution characteristics may be changed by deflecting the illumination directions thereof to right and left. In an example of the swivel lamp 3R (3L), a reflector or a projector in the headlamp is designed to be rotatable in horizontal directions, and a rotation drive means drives the reflector or the projector to rotate by using a drive source, such as a drive motor. A mechanism including the rotation drive means will be referred to as an actuator. When an automobile runs on a curved road, this type of AFS enables the headlamps to provide frontal illumination ahead of the curve in accordance with a running speed of the automobile. Accordingly, the AFS is effective in improving the running safety of the automobile.

To produce a proper illumination in the AFS, it is necessary to properly control a rotational direction and a rotation quantity of the drive motor of the actuator. To the control, it is necessary to exactly detect a rotational position of the drive motor. For example, when the ignition switch of the automobile is turned on, an initializing process to set the optical axes of the headlamps at predetermined deflection positions is carried out. Specifically, the process detects a rotational direction and a rotation quantity of the motor that are measured with respect to a reference rotational position, and sets the rotational position of the motor at an initial position on the basis of the detected rotational direction and the rotation quantity. Therefore, some means to detect an rotational position of the motor is required.

A brushless motor in which a permanent magnet is used for the rotor is conventionally used for the drive motor in the AFS. Accordingly, an rotational position of the motor is detected by using Hall elements for detecting a variation of a magnetic field developed from the rotor. This will be described by using a brushless motor which will be discussed in an embodiment to be described later. As shown in FIG. 7, a rotary shaft 423 is rotatably supported by a first hollowed boss 414 being fixed. A cylindrical rotor 426 is fixedly mounted on the rotary shaft 423. The cylindrical rotor 426 is provided with an annular rotor magnet 428. The annular rotor magnet is mounted on an inner surface of a cylindrical yoke 427 made of synthetic resin, and is circumferentially magnetized to have S and N poles alternately arrayed. Within the cylindrical rotor 426, a stator coil 424 including three pairs of coils equidistantly arrayed in the circumferential direction is fixedly supported on a core base 425. Further, three Hall elements or Hall ICs (referred to as Hall elements) H1, H2 and H3 are arrayed at given angular intervals along the circumference of the cylindrical rotor 426. When the cylindrical rotor 426 is rotated, a magnetic field by the annular rotor magnet 428 varies at the Hall elements H1, H2 and H3. Responsive to the variation of the magnetic field, the Hall elements H1, H2 and H3 change their on/off states to produce pulse signals each having a rectangular waveform corresponding to a rotational period of the cylindrical rotor 426.

In the brushless motor, an AC having different phases U, V and W is supplied to the three coil pairs of the stator coil 424. Then, the directions of the magnetic forces between the coils and the annular rotor magnet 428 are changed to rotate the cylindrical rotor 426 and the rotary shaft 423. With the rotation of the cylindrical rotor 426, the Hall elements H1, H2 and H3 periodically produce rectangular signals (pulse signals). A rotation quantity of the motor may be detected by counting those pulse signals, and a rotational direction and an rotational position of the cylindrical rotor 426 may be detected by computing the logical values of the pulse signals. Another possible way to control the optical axis deflection is that an output angle of the actuator is detected and the radiation optical axis of the headlamp device is controlled in accordance with the detected output angle. In this case, a potentiometer for detecting the rotational position must be provided on the output shaft of the actuator. Provision of the potentiometer is not preferable since it will make the structure of the actuator complicated and increase the size of the actuator.

FIG. 12 is a waveform diagram showing waveforms of output signals of the Hall elements H1, H2 and H3. For example, as shown in FIG. 7, the rotor magnet has different magnetic poles arrayed at the center angle 180°, and the three Hall elements are arrayed at the center angle of 120°. In this case, when the rotor rotates by one turn, the pulse signals output from the Hall elements H1, H2 and H3 vary as shown in FIG. 12(a). As shown, each pulse signal has a periodic waveform in which H level and L level alternately appear with rotation of the motor. Accordingly, it is easy to detect a rotation quantity of the rotor in a manner that pulse signals of the Hall elements are detected, and the pulse signals are counted. If the pulse signals of the Hall elements H1, H2 and H3 are converted into binary signals of H level and L level, combinations as shown in FIG. 13(a) are obtained. Rotational positions arrayed every 60° and the rotational directions of the drive motor are detected from the combinations of those binary signals, i.e., 3-bit code values encoded.

If in such a drive motor, one of the three Hall elements becomes defective and is incapable of producing an output signal, it is difficult to detect an rotational position of the drive motor. Specifically, if the Hall element H1 becomes defective, and is incapable of producing an output signal, the pulse signals output from the Hall elements H2 and H3 vary as shown in FIG. 12(b). Accordingly, as shown in FIG. 13(b), the code value based on the binary signal remains unchanged in a range from the rotational positions P1 to P2 and a range from the rotational positions P4 to P5. Therefore, it is impossible to detect an rotational position located at a midpoint of each of those ranges. As a result, the rotational position of the motor cannot be detected exactly. The rotation control of the drive motor cannot be controlled properly. Further, the drive torque decreases, so that it is difficult to obtain a motor speed as intended or sometimes it is impossible to continuously control the rotation of the drive motor. Consequently, those facts hinder the exact control of the optical axis deflection in the AFS. Those problems are present not only in the Hall element but also in any other detecting element if it detects the rotation of the motor.

SUMMARY OF THE INVENTION

Accordingly, an object of the present invention is to provide a headlamp device for a vehicle which exactly detects an rotational position of a drive motor for the optical axis deflection even when a detecting element, such as a Hall element, becomes detective.

To achieve the above object, there is provided a headlamp device having optical-axis deflecting means for deflecting illumination optical axes of headlamps of a vehicle, the improvement being characterized in that the optical-axis deflecting means comprises: a drive motor as a rotation drive source; a plurality of detecting elements for detecting a rotational position of the drive motor; and motor drive means for controlling a rotation of the drive motor based on a rotational position of the drive motor detected by the detecting elements, wherein the motor drive means includes a rotation-state recognizing means operating such that when any of the plurality of detecting elements is abnormal, the rotation-state recognizing means recognizes a rotational position of the drive motor based on the output signals of the remaining detecting elements and a predetermined angle prediction time computed using a rotational period of the drive motor.

The rotation-state recognizing means includes means for encoding the output signals of the plurality of detecting elements, means for detecting a change of each code value encoded, means for measuring a time duration where each code value changes to thereby set a predetermined angle prediction time, means for recognizing a rotational position of the drive motor from the code values, and means for recognizing a time point when the predetermined angle prediction time has elapsed from a time point that the code value changes, as a rotational position of the drive motor. The drive motor is a brushless motor including a stator coil, and a rotor formed with an annular magnet rotating about the stator coil. In this case, the detecting element is preferably a Hall element which varies an output signal thereof in response to a magnetic field change caused by rotation of the rotor.

In the present invention, even when any of detecting elements used for controlling a rotational position of a drive motor for deflecting the optical axes in a headlamp device is abnormal, the rotation-state recognizing circuit recognizes a rotational position of the drive motor based on the output signals of the remaining detecting elements and a predetermined angle prediction time computed using a rotational period of the drive motor. Even in such a case, the rotation of the drive motor is normally controlled to thereby secure a proper optical-axis deflection control in the headlamp device.

BRIEF DESCRIPTION OF THE DRAWINGS

FIG. 13 is a table showing code values of the output signals of the Hall elements in a normal state and an abnormal state;

DETAILED DESCRIPTION OF THE PREFERRED EMBODIMENTS

Figure 2:
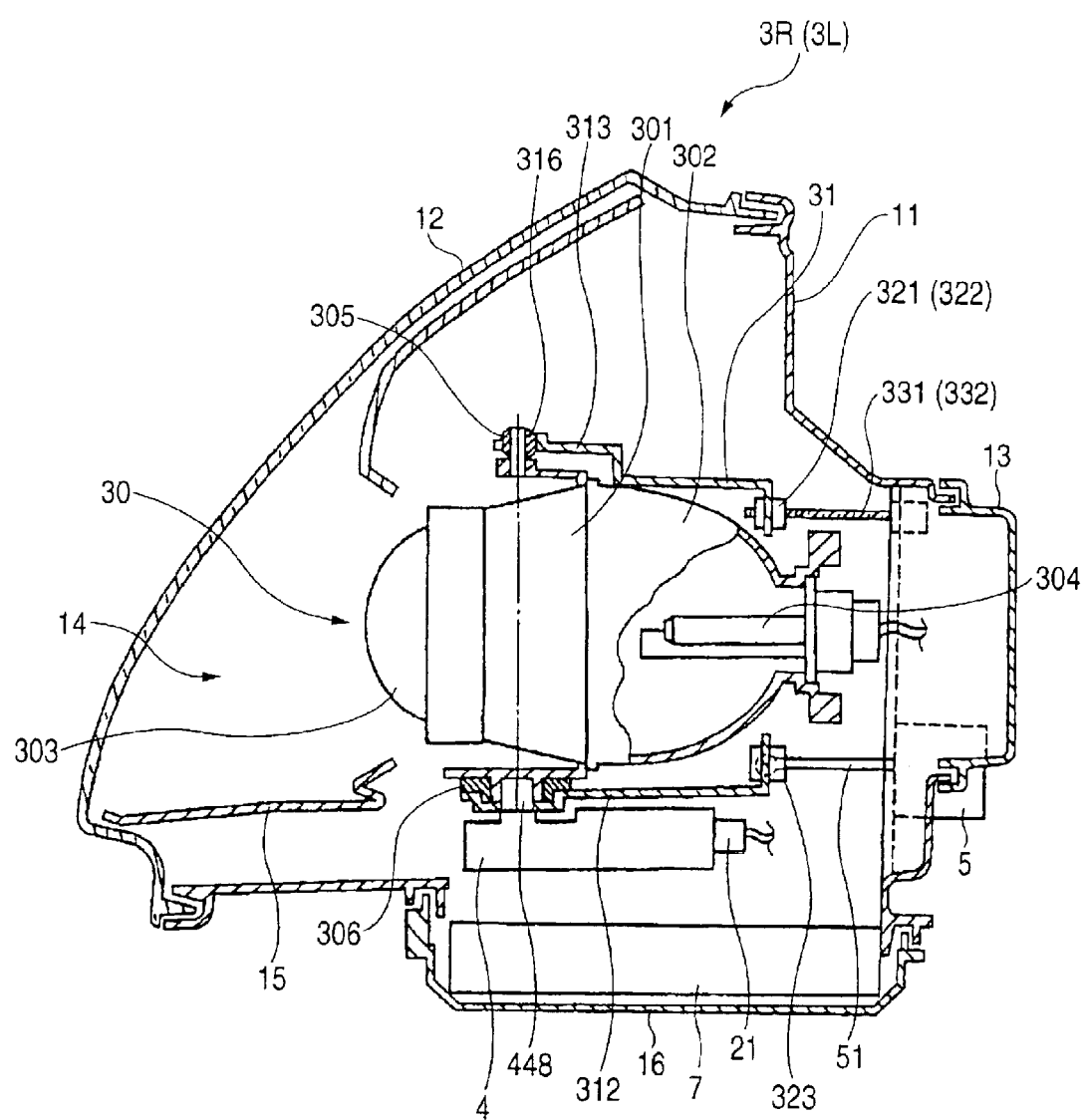
FIG. 2 is a longitudinal sectional view showing a swivel lamp.
Figure 3:
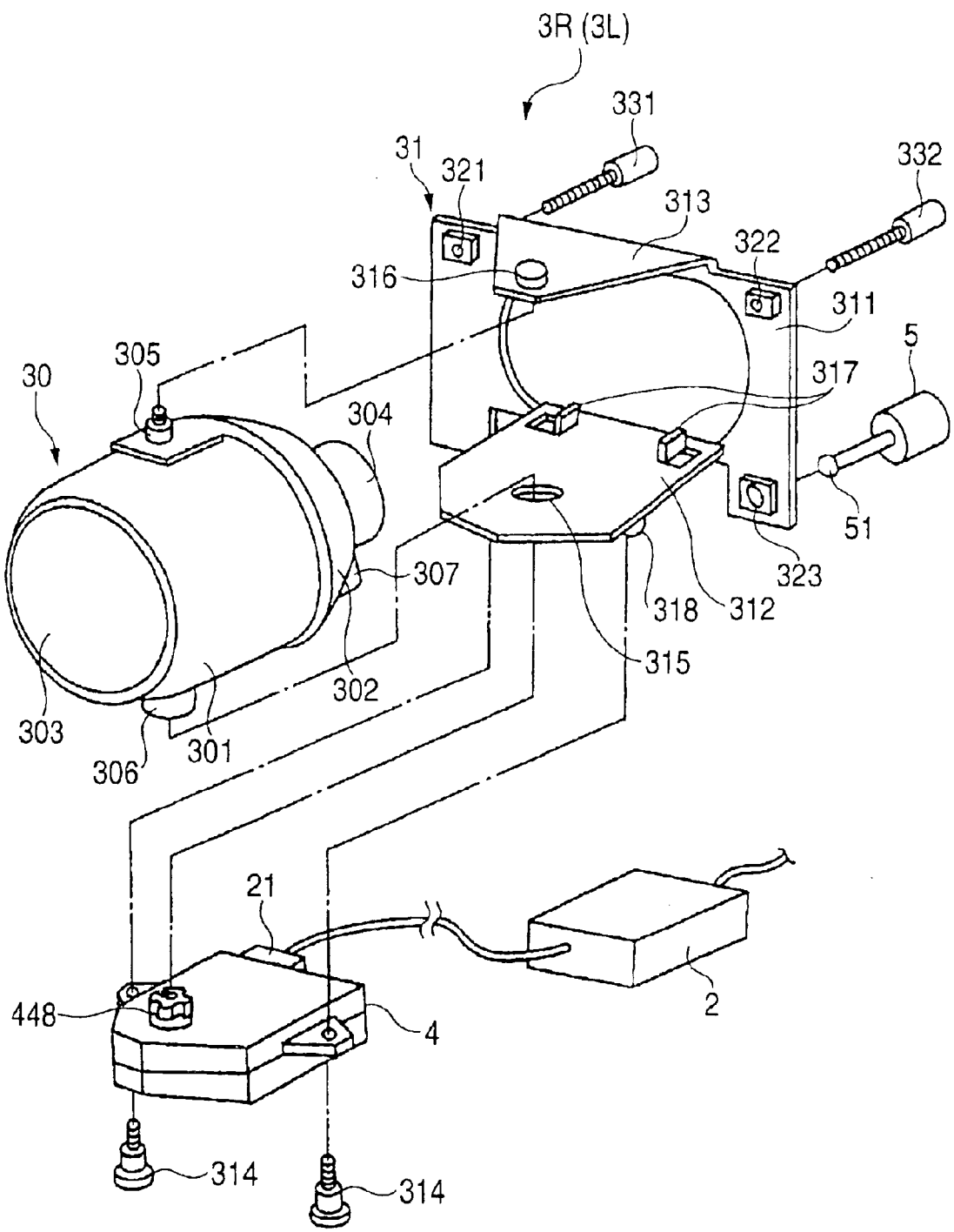
FIG. 3 is an exploded perspective view showing a major part of an internal structure of the swivel lamp.

The preferred embodiment of the present invention will be described with reference to the accompanying drawings. FIG. 2 is a longitudinal sectional view showing an internal structure of a headlamp formed with a swivel lamp which is capable of deflecting an illumination direction to right and left. The headlamp forms one of the components forming the AFS shown in FIG. 1 as lamp deflection angle control means, which is constructed according to the present invention. FIG. 3 is a partially exploded perspective view showing a major part of the swivel lamp. A lens 12 is attached to a front opening of a lamp body 11, and a back cover 13 is attached to a back opening of the lamp body, whereby a lamp chamber 14 is defined. A projector lamp 30 is disposed within the lamp chamber 14. A sleeve 301, a reflector 302, a lens 303 and a light source 304 are integrally assembled into the projector lamp 30. The projector lamp thus constructed has widely been used, and hence, the detailed description of it is omitted. In the embodiment, the light source 304 is a discharge bulb. The projector lamp 30 is supported by a bracket 31 shaped like U lying sideways. An extension 15 is disposed around the projector lamp 30 within the lamp body 11 to thereby prevent the interior of the lamp body from being exposed to outside through the lens 12. Further, in the embodiment, a lighting circuit 7 for lighting the discharge bulb of the projector lamp 30 is mounted by utilizing an under cover 16 mounted to a bottom opening of the lamp body 11.

The projector lamp 30 is supported in a state that it is sandwiched between a lower plate 312 and an upper plate 313, which are bent substantially vertically to a vertical plate 311 of the bracket 31. An actuator 4 to be described later is fixed to the under side of the lower plate 312 by means of screws 314. A rotary output shaft 448 of the actuator 4 is protruded to the upper side through a shaft hole 315 bored in the lower plate 312. The screws 314 are fastened to bosses 318 protruded from the lower surface of the lower plate 312. A shaft part 305 provided on the upper surface of the projector lamp 30 is fit into a bearing 316 provided on the upper plate 313. A coupling part 306 provided on the lower surface of the projector lamp 30 is fit and coupled to the rotary output shaft 448 of the actuator 4. As a result, the projector lamp 30 is swiveled to right and left with respect to the bracket 31. As will be described later, the projector lamp 30 is swiveled in horizontal directions together with the rotary output shaft 448 by the operation of the actuator 4.

Aiming nuts 321 and 322 are, respectively, mounted on right and left locations on an upper part of the bracket 31 as viewed from front. A leveling bearing 323 is mounted on a right lower location on the upper part of the bracket. A horizontal aiming screw 331 shaft-rotatably supported by the lamp body 11 and a vertical aiming screw 332 are screwed into those aiming screws, respectively. A leveling ball 51 of the leveling mechanism 5 is fit into the leveling bearing. The bracket 31 is turned horizontally and vertically by turning the horizontal aiming screw 331 and the vertical aiming screw 332. The bracket 31 is turned in a vertical direction by moving forward and backward the leveling ball 51 by the leveling mechanism 5. This structure enables one to perform the aiming adjustment and the leveling adjustment. The aiming adjustment adjusts the optical axis of the projector lamp 30 in the vertical and horizontal directions. The leveling adjustment adjusts the optical axis of the projector lamp in the vertical direction in accordance with a leveling state caused by the vehicle height of the vehicle. A protrusion 307 is protruded from the lower surface of the reflector 302 of the projector lamp 30. A couple of stoppers 317 are raised by cutting from the lower plate 312 of the bracket 31 opposed to the protrusion, at right and left locations on the lower plate. With rotation of the projector lamp 30, the protrusion 307 hits either of the stoppers 317, to define a rotatable range of the projector lamp 30.

Figure 4:
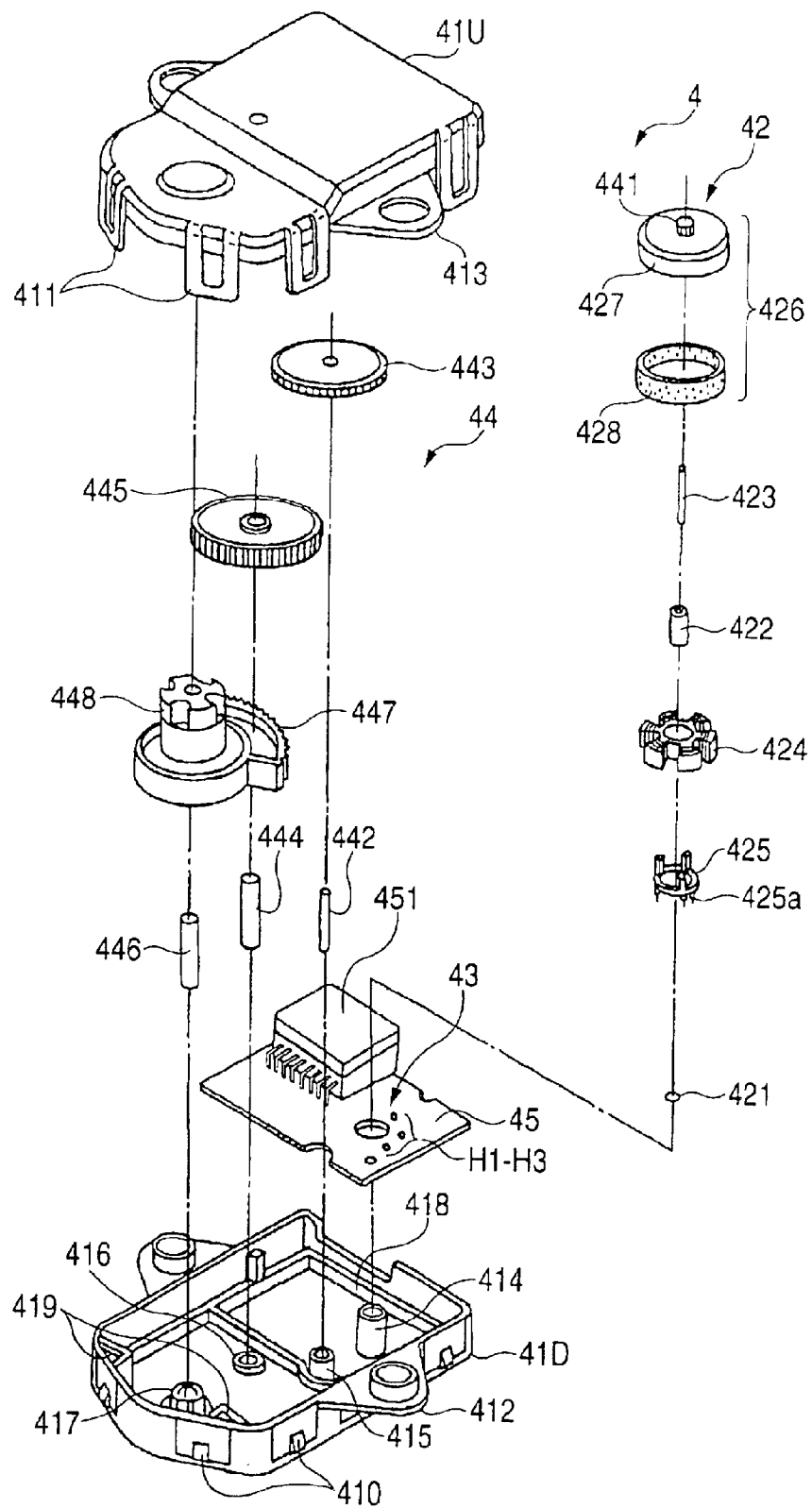
FIG. 4 is a partially exploded perspective view showing an actuator.
Figure 5:
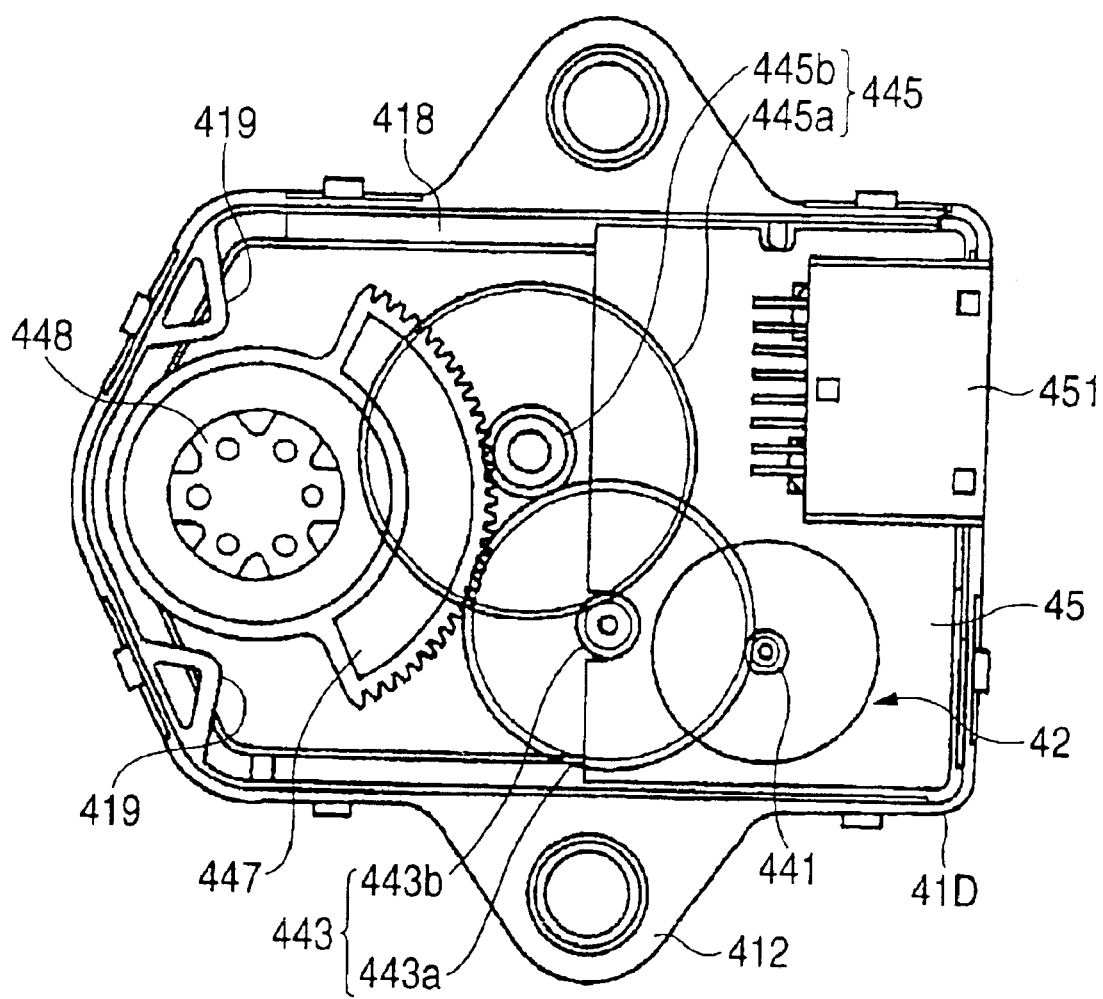
FIG. 5 is a plan view showing the actuator.
Figure 6:
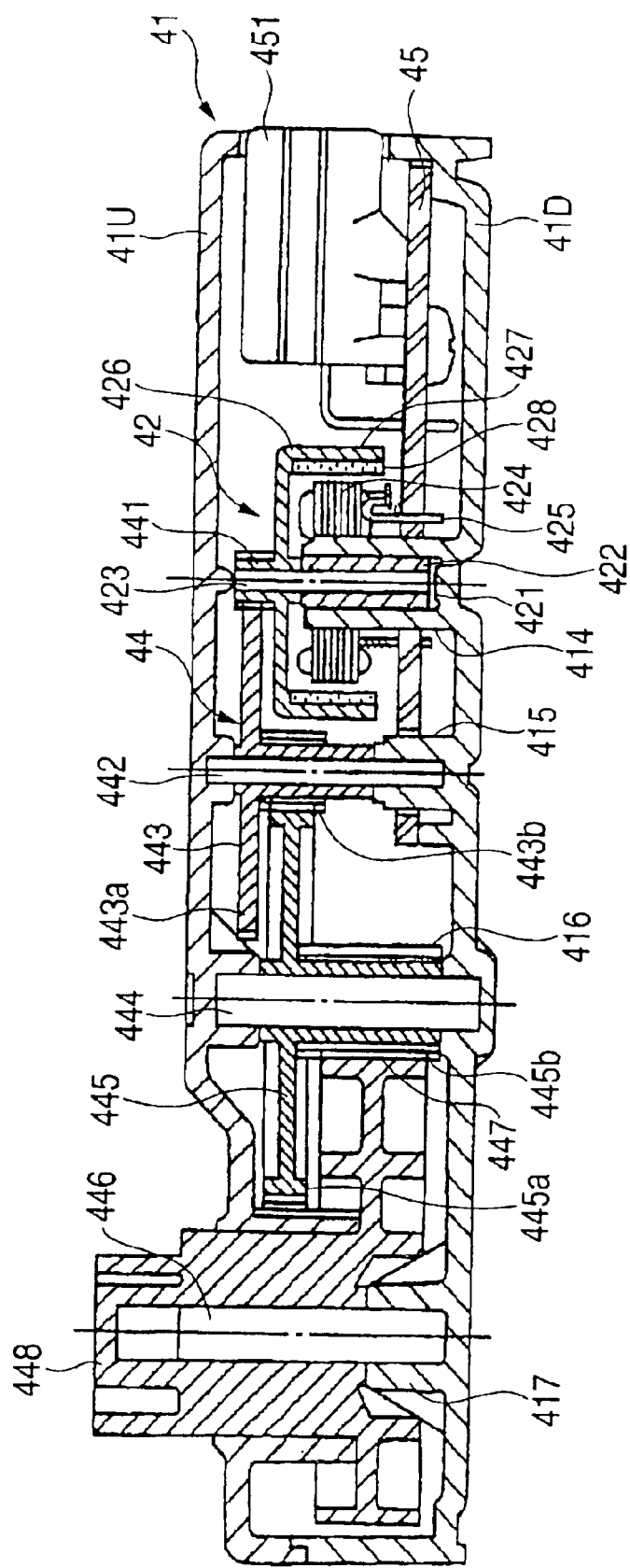
FIG. 6 is a longitudinal sectional view showing the actuator.

FIG. 4 is an exploded perspective view showing a major portion of the actuator 4 for swiveling the swivel lamps 3R and 3L. FIG. 5 is a plan view showing the actuator assembled. FIG. 6 is a longitudinal sectional view showing the actuator. A case 41 includes a lower half 41D and an upper half 41U, each being shaped like a pentagonal dish. A plurality of protrusions 410 protruded from a circumferential surface of the lower half 41D are fit into a plurality of fitting pieces 411 extended downward from a circumferential surface of the upper half 41U, whereby a case chamber is formed therein. Support pieces 412 and 413 outwardly project from both sides of the upper half 41U and the lower half 41D. Those support pieces are used for fastening the case 41 to the bosses 318 of the bracket 31 by means of screws 314. A splined rotary output shaft 448 is extended from the upper surface of the case 41 and coupled to the coupling part 306 of the bottom surface of the projector lamp 30. A connector 451 is located on the back surface of the case 41, and is fit to an external connector 21 (see FIG. 2) connected to the ECU 2.

Four hollowed bosses 414, 415, 416 and 417, while standing erect, are located at predetermined positions on the inner bottom surface of the lower half 41D of the case 41. A brushless motor to be described later, which serves as a drive motor, is assembled at the first hollowed boss 414. Shafts of a gear mechanism 44 are respectively inserted into the second to fourth hollowed bosses 415, 416 and 417, as will be described later. A printed circuit board 45 is placed on a stepped rib 418, which is formed along a peripheral edge of the inner bottom surface of the lower half 41D. The printed circuit board 45 is internally supported within the case 41 in a state that it is held between the stepped rib and the upper half 41U. The printed circuit board 45 is electrically connected to the brushless motor 42, and various electronic parts (not shown) of a control circuit 43 to be described later and the connector 451 are mounted on the printed circuit board.

Figure 7:
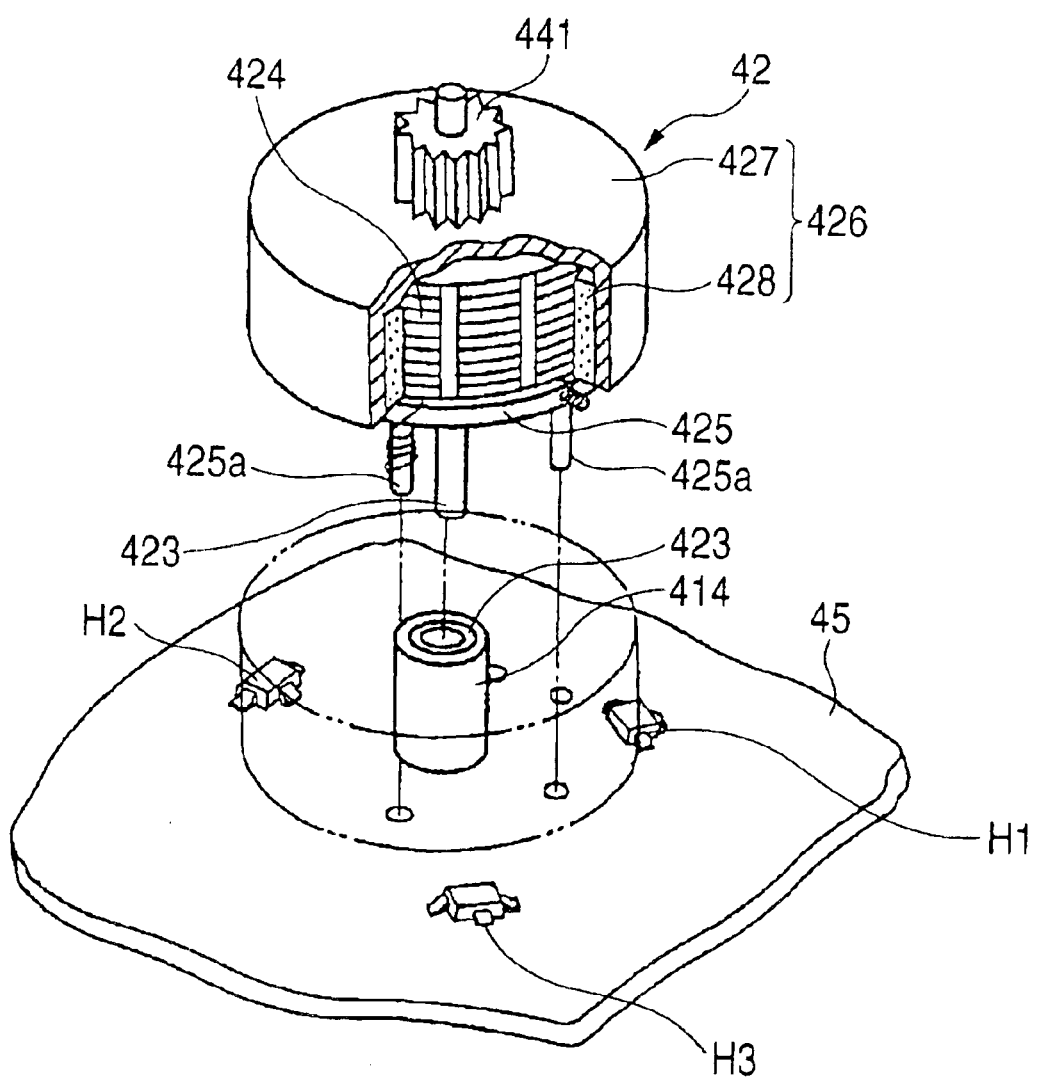
FIG. 7 is a partially enlarged perspective view showing a brushless motor.

As shown in FIG. 7 as a partially broken perspective view, in the brushless motor 42, the rotary shaft 423 is rotatably supported by the first hollowed boss 414 of the lower half 41D by a thrust bearing 421 and a sleeve bearing 422. Within the cylindrical rotor 426, a stator coil 424 including three pairs of coils equidistantly arrayed in the circumferential direction is fixedly supported by the first hollowed boss 414. The stator coil 424 is electrically connected to the printed circuit board 45 to feed electric power thereto. In the embodiment, the stator coil 424 and the core base 425 are assembled into a unit body. The stator coil is electrically connected to the control circuit 43 by use of a terminal 425a. The cylindrical rotor 426 is fixedly mounted on the upper end of the rotary shaft 423, while covering the stator coil 424. The cylindrical rotor 426 includes the cylindrical yoke 427 made of resin, and the annular rotor magnet 428 which is mounted on an inner surface of the cylindrical yoke 427, and is circumferentially magnetized to have S and N poles alternately arrayed.

In the thus constructed brushless motor 42, an AC having different phases U, V and W is supplied to the three coil pairs of the stator coil 424. Then, the directions of the magnetic forces between the coils and the annular rotor magnet 428 are changed to rotate the cylindrical rotor 426 and the rotary shaft 423. As shown in FIG. 7, a plurality of detecting elements are supported on the printed circuit board 45, while being disposed at given angular intervals along the circumference of the cylindrical rotor 426. In this embodiment, three Hall elements H1, H2 and H3 are supported on the printed circuit board, while being circumferentially arrayed at an angular interval of 120° (center angle). When the annular rotor magnet 428 is rotated together with the cylindrical rotor 426, a magnetic field is varied at the Hall elements H1, H2 and H3. Then, the Hall elements H1, H2 and H3 change their on/off states to produce pulse signals whose H and L levels periodically change corresponding to a rotational period of the cylindrical rotor 426.

A first gear 441 and the cylindrical yoke 427 of the cylindrical rotor 426 are resin molded into one piece. The first gear 441 forms a part of the gear mechanism 44. In the gear mechanism 44, a rotational force of the first gear 441, while being successively decelerated, is transmitted to a second large-diameter gear 443a and a second small-diameter gear 443b of a second gear 443, which is rotatably supported by a first fixed shaft 442, a third large-diameter gear 445a and a third small-diameter gear 445b of a third gear 445, which is rotatably supported by a second fixed shaft 444, and a sector gear 447 integral with the rotary output shaft 448, which is rotatably supported by a third fixed shaft 446. Stoppers 419 are protruded from the locations on the inner surface of the lower half 41D which are on both sides of the sector gear 447 as viewed in the rotational direction of the gear. Those stoppers will hit the ends of the sector gear 447 to thereby define a full rotation angular range of the sector gear 447, or the rotary output shaft 448. The full rotation angular range of the sector gear 447 is designed to be somewhat larger than that of the projector lamp 30 defined by the protrusion 307 and the stoppers 317.

Figure 8:
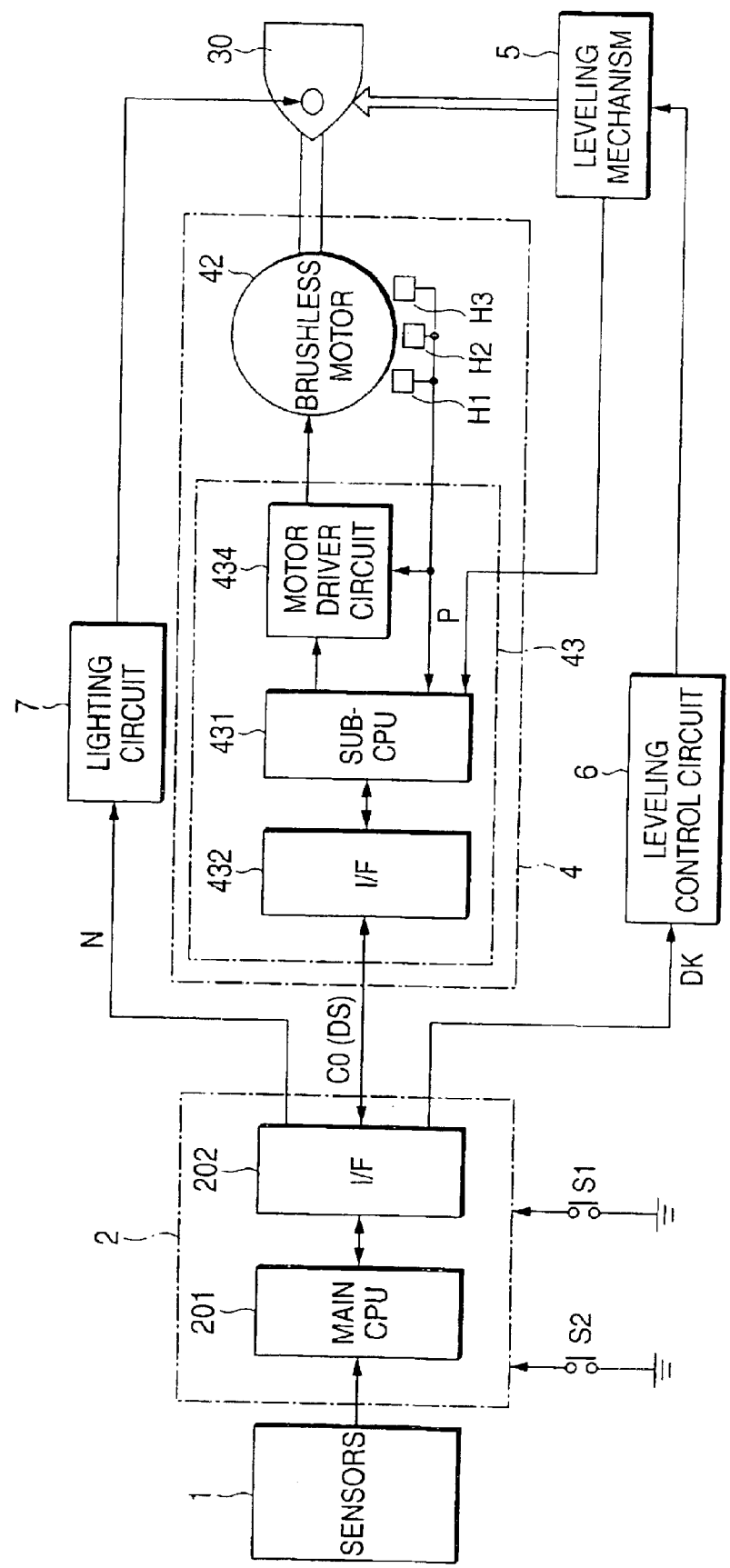
FIG. 8 is a block circuit showing a circuit arrangement of the AFS.

FIG. 8 is a block circuit showing a circuit arrangement of an illumination device including the ECU 2 and the actuator 4. The actuator 4 is assembled into each of the right and left swivel lamps 3R and 3L of an automobile, and able to bidirectionally communicate with the ECU 2. The ECU 2 contains a main CPU 201 which carries out a process based on a predetermined algorithm in accordance with information from the sensors 1, and outputs predetermined control signals CO, and an interface (I/F) circuit 202 through which the control signals CO is transferred between the main CPU 201 and the actuator 4. An on/off signal for an illumination switch S1 provided on the automobile may be input to the ECU 2. The lighting circuit 7 which is connected to an on-vehicle power source and supplies electric power to the light source 304 of the projector lamp 30, is controlled by control signals N based on an on/off of the ignition switch S1, whereby the swivel lamps 3R and 3L are turned on or off selectively. The ECU 2 controls, by a leveling signal DK, a leveling control circuit 6 for controlling the leveling mechanism 5, which vertically adjusts the optical axis of the bracket 31 supporting the projector lamp 30, whereby the optical axis of the projector lamp 30 is adjusted when the vehicle height of the automobile changes. Those electric circuits are connected to and disconnected from the power source by use of an ignition switch S2 for turning on and off electric systems of the automobile, as a matter of course.

The control circuit 43 on the printed circuit board 45 contained in the actuator 4 of each of the right and left swivel lamps 3R and 3L of the automobile, includes an I/F circuit 432 through which signals are transferred to and from the ECU 2, a sub-CPU 431 for carrying out a process based on a predetermined algorithm in accordance with a signal coming in through the I/F circuit 432 and pulse signals P output from the Hall elements H1, H2 and H3, and a motor driver circuit 434 as a rotation drive means for driving and rotating the brushless motor 42. The ECU 2 outputs a horizontal deflection angle signal DS for the swivel lamps 3R and 3L as one of the control signals CO to the actuator 4.

Figure 9:
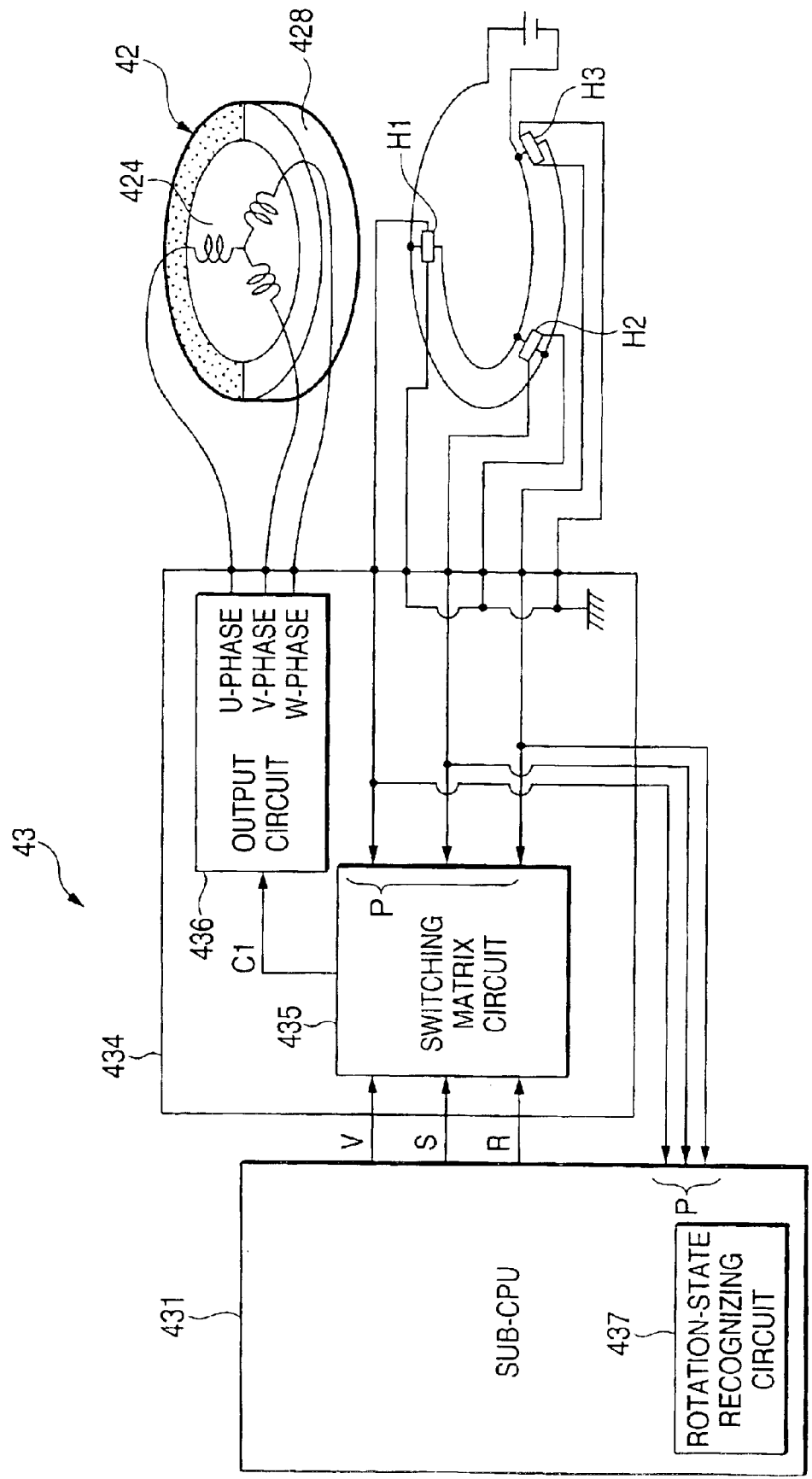
FIG. 9 is a circuit diagram showing an actuator.

FIG. 9 is a diagram showing the motor driver circuit 434 in the control circuit 43 of the actuator 4 and showing the brushless motor 42. The motor driver circuit 434 receives a speed control signal V, a start/stop signal S, and a forward/reverse signal R, which are control signals from the sub-CPU 431 of the control circuit 43. The motor driver circuit 434 includes a switching matrix circuit 435 which receives pulse signals from the three Hall elements H1, H2 and H3, and an output circuit 436 which receives an output signal from the switching matrix circuit 435 and adjusts the phases (U, V and W phases) of the three-phase AC power to be supplied to the three pairs of coils of the stator coil 424 of the brushless motor 42. The motor driver circuit 434 supplies the electric powers of U, V and W phases to the stator coil 424, so that the annular rotor magnet 428 rotates, and the cylindrical yoke 427 integral with the annular rotor magnet 428, viz., the cylindrical rotor 426 and the rotary shaft 423, rotates. When the annular rotor magnet 428 rotates, the Hall elements senses a change of a magnetic field developed by the rotor magnet and outputs pulse signals P. The pulse signals P are input to the switching matrix circuit 435, and the switching matrix circuit 435 performs a switching operation for the output circuit 436 at the timings of the pulse signals, whereby the rotation of the cylindrical rotor 426 is continued.

The switching matrix circuit 435 outputs predetermined control signals C1 in response to the speed control signal V, the start/stop signal S and the forward/reverse signal R, which are output from the sub-CPU 431. Upon receipt of the control signals C1, the output circuit 436 adjusts the phases of the three-phase AC power to be supplied to the stator coil 424 to thereby control the start and stop of the rotation of the brushless motor 42, the rotational direction of the motor, and the motor speed. The sub-CPU 431 contains a rotation-state recognizing circuit 437 which receives some of the pulse signals P output from the Hall elements H1, H2 and H3, and detects the rotation quantity, the rotational direction, and the rotational position of the brushless motor 42.

Figure 10:
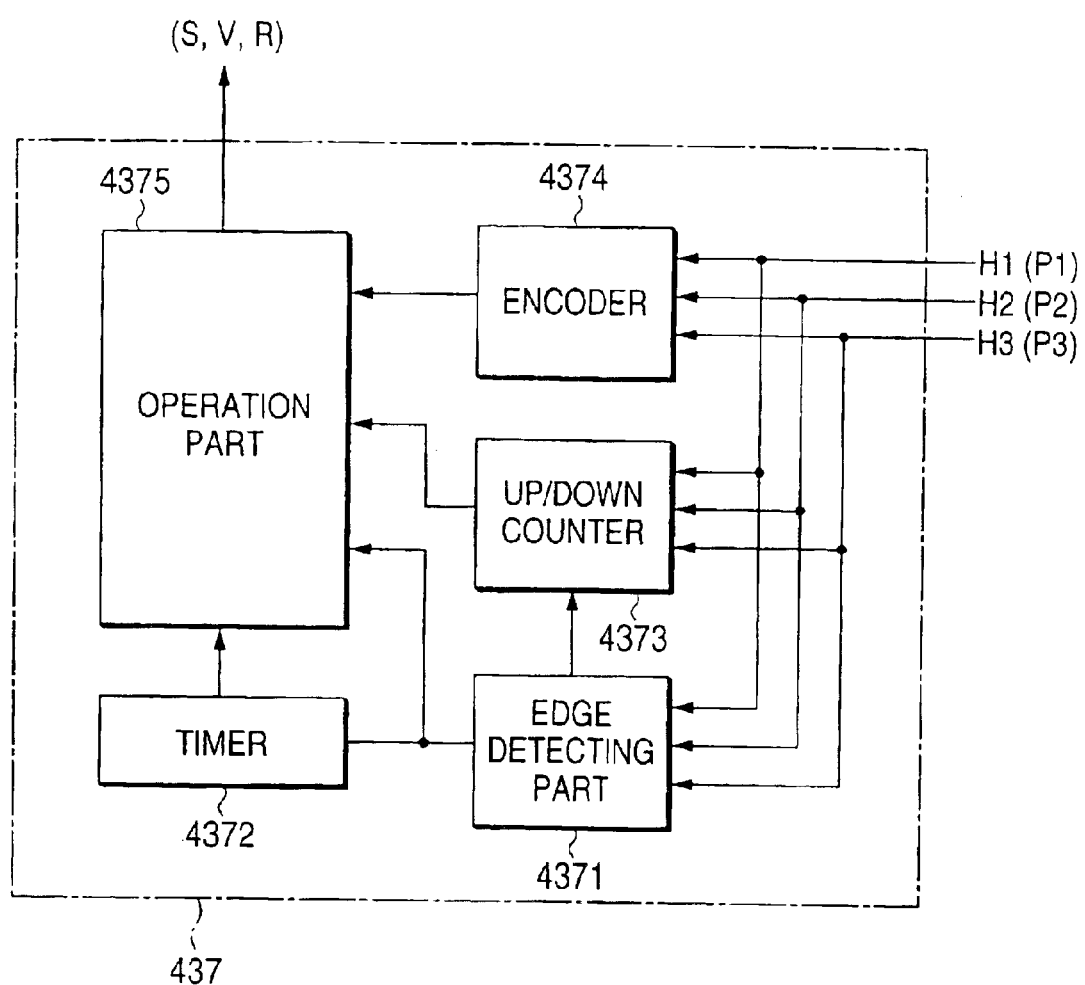
FIG. 10 is a block circuit showing a circuit arrangement of a rotation-state recognizing circuit.

The rotation-state recognizing circuit 437 includes an edge detecting part 4371, a timer 4372, an up/down counter 4373, an encoder 4374, and an operation part 4375. The edge detecting part 4371 detects leading and trailing edges of the pulse signals output from the Hall elements H1, H2 and H3, as shown in FIG. 10. The timer 4372 measures a time interval $\Delta t$ between the adjacent edge signals detected by the edge detecting part 4371 by using a reference clock signal. The up/down counter 4373 counts the edges of the pulse signals of all or any of the Hall elements H1, H2 and H3. The encoder 4374 encodes H and L levels of the pulse signals of the Hall elements H1, H2 and H3 into 3-bit code values. The operation part 4375 computes the rotation quantity, rotational direction and rotational position of the brushless motor 42 by using the edge signals detected by the edge detecting part 4371, the edge intervals measured by the timer 4372, the count values of the up/down counter 4373, and the code values encoded by the encoder 4374, and generates control signals for generating the signals V, S and R. Operation of the rotation-state recognizing circuit 437 will be described later.

Figure 1:
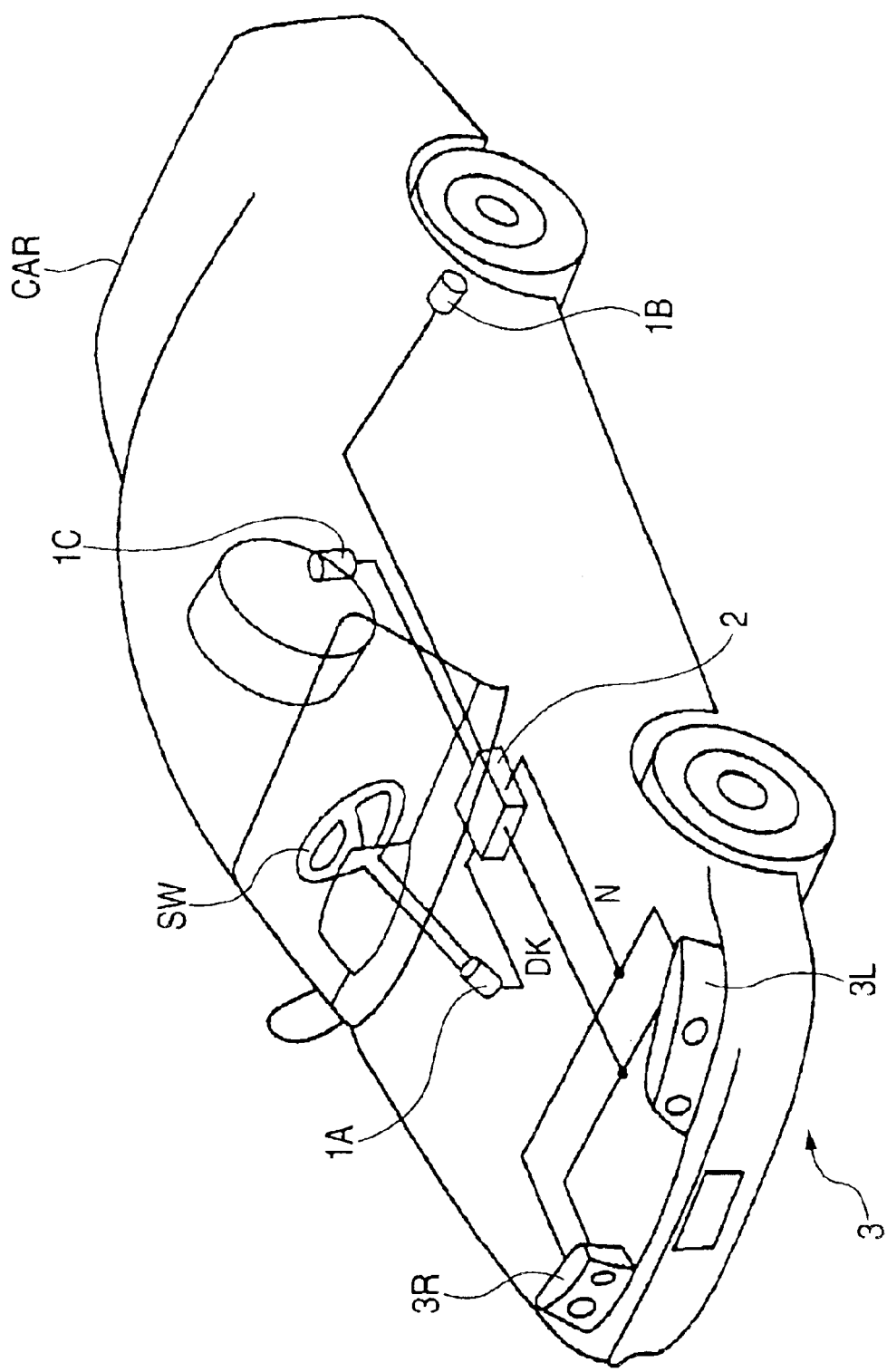
FIG. 1 is a diagram showing a concept of the AFS.

With such a circuit arrangement, in a state that the ignition switch S2 is turned on and the ignition switch S1 is turned on, when the ECU 2 receives information, such as a steering angle of the steering wheel SW of the automobile, a speed of the automobile, a vehicle height of the automobile, from the sensors 1 attached to the automobile, as shown in FIG. 1, the main CPU 201 in the ECU 2 performs operations by using the sensor output signals received, and computes a horizontal deflection angle signal DS of the projector lamp 30 of each of the swivel lamps 3R and 3L of the automobile, and inputs it to the actuators 4 of both the swivel lamps 3R and 3L. In the actuator 4, the sub-CPU 431 performs the operation by use of the horizontal deflection angle signal DS to compute a signal corresponding to the horizontal deflection angle signal DS and to output it to the motor driver circuit 434. As a result, the brushless motor 42 is driven to rotate. A rotational force of the brushless motor 42 is decelerated by the gear mechanism 44 and then transmitted to the rotary output shaft 448. Accordingly, the projector lamp 30 coupled to the rotary output shaft 448 is rotated in the horizontal direction, and the optical axes of the swivel lamps 3R and 3L are deflected horizontally. In turning the projector lamp 30, a deflection angle of the projector lamp 30 is detected from a rotational angle of the brushless motor 42. Specifically, as shown in FIG. 8, the rotation-state recognizing circuit 437 of the sub-CPU 431 detects the deflection angle by using the pulse signals P (P1, P2 and P3) output from the Hall elements H1, H2 and H3 contained in the brushless motor 42. And, the sub-CPU 431 compares the detected signal representative of the deflection angle with the horizontal deflection angle signal DS coming from the ECU 2. If those signals are not equal, the sub-CPU 431 feedback controls the rotation angle of the brushless motor 42 so that those signals are equal to each other. Consequently, the sub-CPU 431 sets the optical axis direction of the projector lamp 30, i.e., the optical axis directions of the swivel lamps 3R and 3L, accurately to a deflection position indicated by the horizontal deflection angle signal DS.

By the deflection operation of the projector lamp 30, the deflected light beams emitted from the swivel lamps 3R and 3L illuminate a frontal area deviated sideways from the straightforward direction of the automobile. Thus, the headlamps of the running automobile are capable of providing illumination ahead of the automobile not only in the straightforward direction but also in the steered direction, thereby facilitating the running safety of the automobile.

Figure 11:
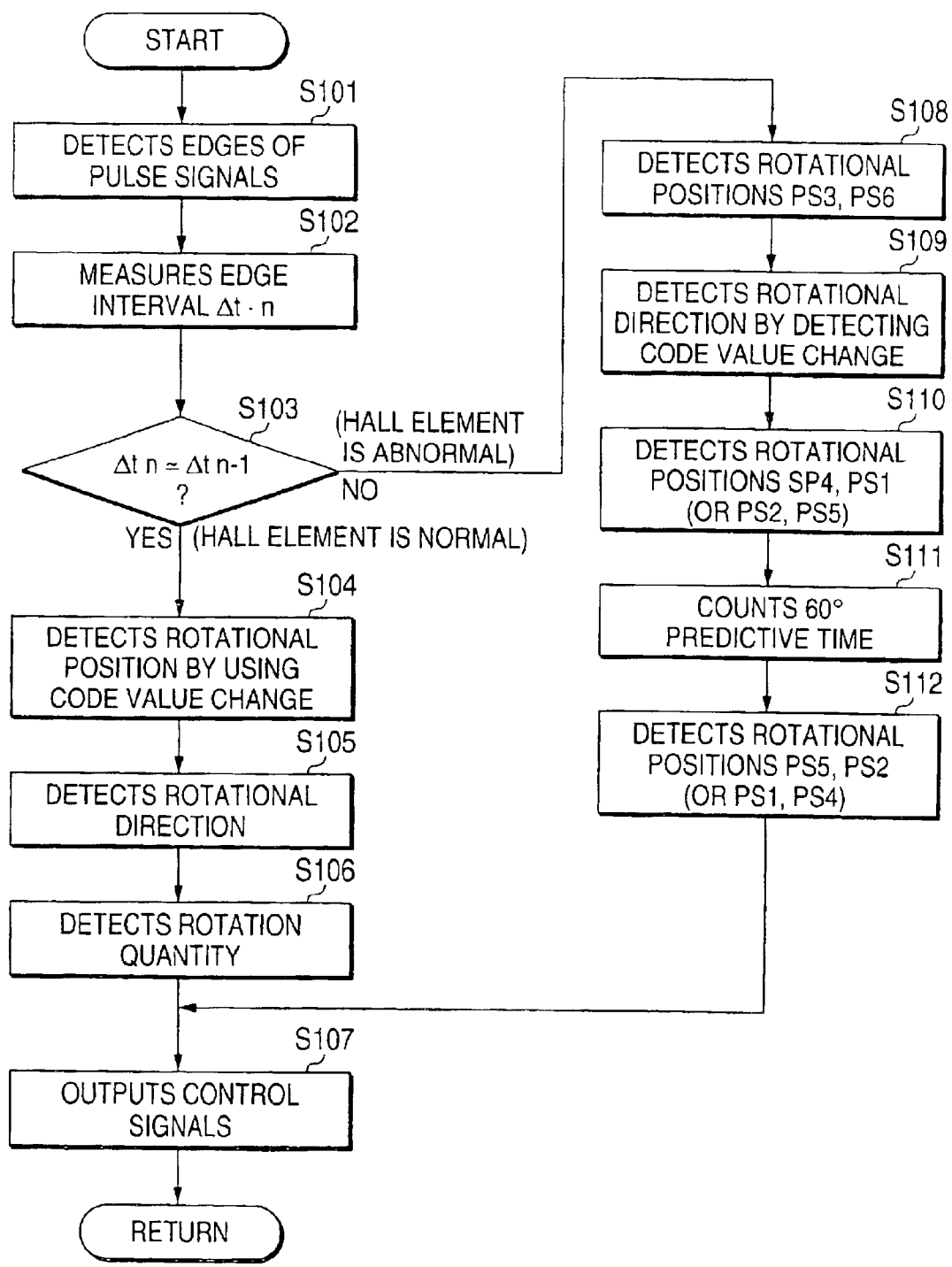
FIG. 11 is a flow chart showing a detecting operation of detecting a rotational position and others.
Figure 12A:
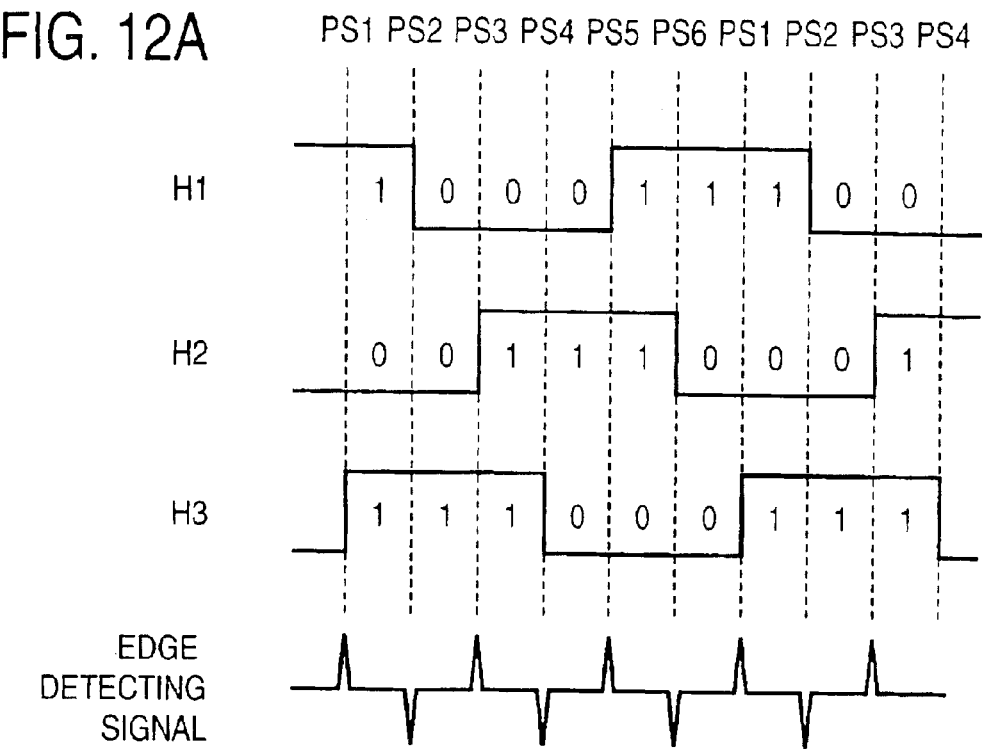
FIG. 12 is a waveform diagram showing waveforms of pulse signals output from Hall elements in a normal state and an abnormal state.

Rotation-state recognizing operation of the brushless motor 42 by the rotation-state recognizing circuit 437 will be described with reference to a flow chart of FIG. 11. The brushless motor 42 rotates, and the Hall elements H1, H2 and H3 output pulse signals shown in FIG. 12(a) to the rotation-state recognizing circuit 437. Upon receipt of those pulse signals, the edge detecting part 4371 of the rotation-state recognizing circuit detects the leading and trailing edges of the pulse signals for a predetermined period of time (S101). Then, the timer 4372 successively measures edge intervals $\Delta t \cdot n$ of the detected edge detecting signals (S102), and successively compares the measured edge intervals $\Delta t \cdot n$ with the edge interval $\Delta t \cdot n$ precedingly measured (S103). When all of the measured edge intervals satisfy the condition of $\Delta t \cdot n \approx \Delta t \cdot n-1$, it is judged that all of the Hall elements produce proper pulse signals, and those elements are normal. The expression is an approximate expression since the expression is constructed allowing for a variation of rotations of the drive motor. The edge interval $\Delta t \cdot n$ which satisfies the condition is used as a 60° predictive time to be described later.

Figure 14:
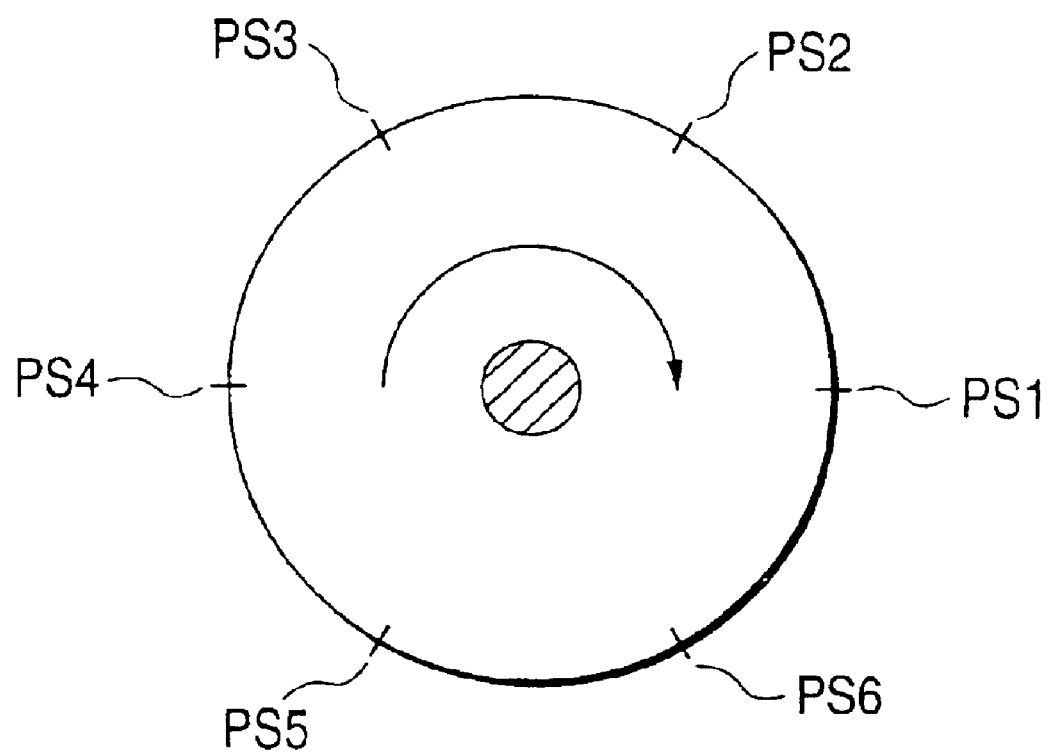
FIG. 14 is a model diagram useful in explaining rotational positions of the drive motor.

When the Hall elements are normal in the step S103, the encoder 4374 recognizes H and L levels of the pulse signals from the Hall elements H1, H2 and H3 in terms of binary signals, and encodes those binary signals into 3-bit code values, as shown in FIG. 13(a). The operation part 4375 receives the edge detecting signal from the edge detecting part 4371, recognizes its code value, and detects a change of the code value from the preceding one. By detecting the code value change, the operation part recognizes rotational positions PS1 to PS6 obtained by equally dividing one turn of the brushless motor 42 into six sectors as shown in FIG. 14 (S104). The operation part 4375 also detects a rotational direction of the brushless motor 42 by using the code value and its change (S105). The rotation-state recognizing circuit detects a rotation quantity of the brushless motor 42 by counting the edge detection signal of each Hall element by the up/down counter 4373 (S106). In this way, the rotation-state recognizing circuit 437 recognizes the rotation quantity, the rotational direction and the rotational position of the brushless motor 42. In particular, the rotation-state recognizing circuit outputs control signals to the sub-CPU 431 at the timing of detecting the rotational position, causes the CPU to generate the signals V, S and R, and properly rotates the brushless motor 42.

Figure 12B:
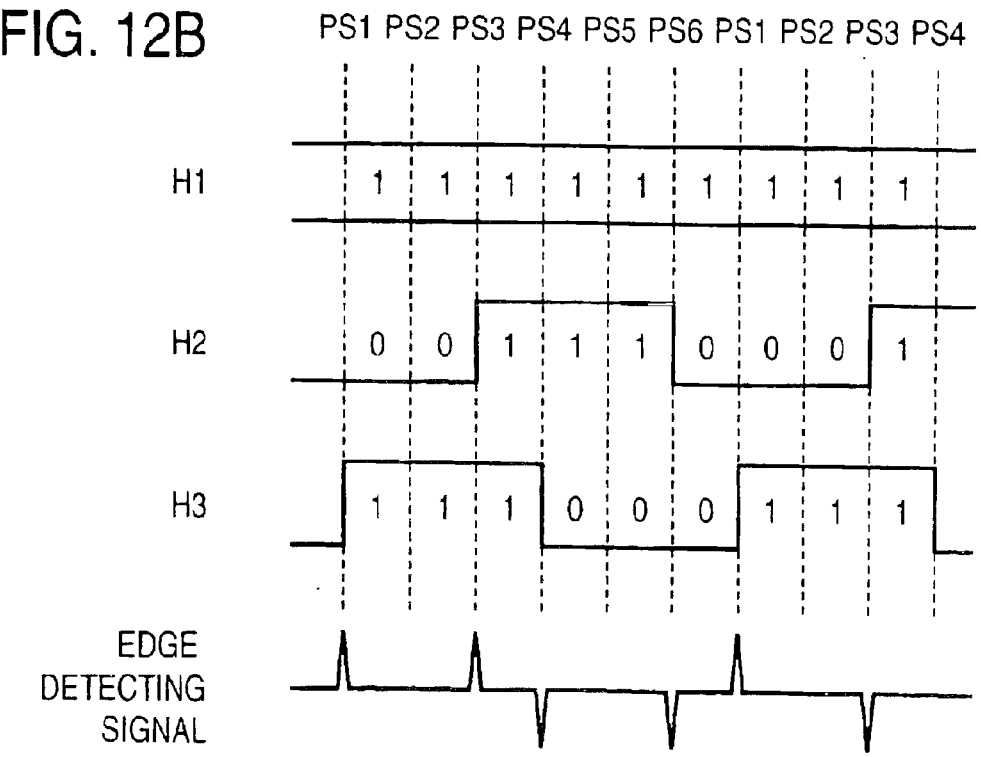

When the condition of the above expression is not satisfied in the step S103, it is judged that any of the Hall elements doe not produce a pulse signal, and becomes defective. For example, when the Hall element H1 becomes defective and successively outputs only H level signals as shown in FIG. 12(b), a missing part occurs in the edge detecting signal. In this case, the edge interval $\Delta t \cdot n$ is long at the missing part, and the condition in the step S103 is not satisfied. In this case, the code values output from the encoder 4374 are also abnormal as shown in FIG. 13(b). As shown, the code value remains unchanged between the rotational positions PS1 and PS2, and between the rotational positions PS4 and PS5. Accordingly, it is difficult to detect those rotational positions PS1, PS2, PS4 and PS5 by using the code value change. However, the rotational positions PS3 and PS6 are definitely determined since the code value changes from the preceding one.

After the step S103 determines that the Hall element is abnormal, the code value of the output signal of the encoder 4374 is detected at the timing of the edge detecting signal and the rotational position PS3 or PS6 is detected (S108). At the timing of the next edge detecting signal, a change of the code value is detected, and a rotational direction of the brushless motor 42 is detected by using a change quantity of the code value (S109). For a rotational direction from PS3 to PS4, the difference between the code values is "10", and for a rotational direction from PS3 to PS2, the code difference is "01". Accordingly, in this case, the rotational positions is recognized as PS4 or PS1, or PS2 or PS5. At the same time, the timer 4372 measures a 60° predictive time $\Delta t \cdot n$ by using the timing of this edge detecting signal, and counts the 60° predictive time $\Delta t \cdot n$ (S111). At the timing of the time counting, the code value is recognized, and when the code value does not change from the preceding code value, the rotational positions is recognized as PS5 or PS2, or PS1 or PS4 (S112). When the code value changes from the preceding one, it is recognized that the brushless motor 42 starts its reverse rotation and returns to the preceding rotational position. Thereafter, in the step S107, a rotation quantity of the brushless motor 42 is detected by counting an edge detecting signal of each normal Hall element by the up/down counter 4373.

As described above, even when one of the three Hall elements H1, H2 and H3 is abnormal, the rotational position of the drive motor is recognized by using the remaining two Hall elements, and the rotation of the brushless motor 42 is properly controlled. Accordingly, the optical axes of the swivel lamps 3R and 3L whose deflection is controlled by the brushless motor 42 are properly controlled.

When the drive motor is stopped and then restarted at any of the rotational positions PS1, PS2, PS4 and PS5, control cannot recognize the rotational position and sometimes the motor fails to start its rotation. In this case, the operation part 4375 generates a control signal corresponding to a preset rotational position and tries to start the brushless motor 42. Rotation of the brushless motor 42 can be checked by using the pulse signals from the Hall elements. When the brushless motor 42 cannot be rotated even if the control signal is used, the operation part 4375 generates a control signal corresponding to a rotational position advanced by 60° in a rotational direction of the motor when it starts its rotation at a preset rotational position. Thus, the brushless motor 42 can be started by successively generating control signals corresponding to different rotational positions.

In the embodiment mentioned above, the case where the Hall element H1 is abnormal is discussed by way of example. It is evident that even when the Hall element H2 or H3 is abnormal, a rotational position of the drive motor can be recognized by utilizing the remaining two Hall elements.

In the embodiment, the rotor of the drive motor is formed with a magnet having two magnetic poles arrayed at 180° of the center angle, and the three Hall elements H1, H2 and H3 are arrayed at an angular interval of 120°. It is evident that the invention is applied to a drive motor in which the rotor is formed with a magnet having at least four magnetic poles, and the three Hall elements are arrayed at an angular interval of 60°.

In the embodiment mentioned above, the projector lamps as swivel lamps are applied to the headlamps in which the illumination optical axes are deflected to right and left. If required, the invention may be applied to the headlamps in which a substantial illumination range is changed by deflecting only the reflector or deflecting an auxiliary reflector provided separately from the main reflector.

As seen from the foregoing description, the present invention contains a rotation-state recognizing circuit operating such that when any of Hall elements used for controlling a rotational position of a drive motor for deflecting the optical axes in a headlamp device is abnormal, the rotation-state recognizing circuit recognizes a rotational position of the drive motor based on the output signals of the remaining Hall elements and a predetermined angle prediction time computed using a rotational period of the drive motor. With provision of the rotation-state recognizing circuit, even when any of the Hall elements becomes defective, the rotation of the drive motor is normally controlled to thereby secure a proper optical-axis deflection control in the headlamp device.

What is claimed is:

1. A vehicle headlamp device comprising:
    optical-axis deflecting means for deflecting illumination optical axes of headlamps of a vehicle,
    said optical-axis deflecting means comprising:
    a drive motor as a rotation drive source;
    a plurality of detecting elements for detecting a rotational position of said drive motor; and
    motor drive means for controlling a rotation of said drive motor based on a rotational position of said drive motor detected by said detecting elements,
    wherein said motor drive means includes a rotation-state recognizing means operating such that when any of said plurality of detecting elements is abnormal, said rotation-state recognizing means recognizes a rotational position of said drive motor based on the output signals of the remaining detecting elements and a predetermined angle prediction time computed using a rotational period of said drive motor.

2. A vehicle headlamp device according to claim 1, wherein said rotation-state recognizing means includes means for encoding the output signals of said plurality of detecting elements, means for detecting a change of each said code value encoded, means for measuring a time duration where each said code value changes to thereby set a predetermined angle prediction time, means for recognizing a rotational position of said drive motor from said code values, and means for recognizing a time point when said predetermined angle prediction time has elapsed from a time point that said code value changes, as a rotational position of said drive motor.

3. A vehicle headlamp device according to claim 2, wherein said drive motor is a brushless motor including a stator coil, and a rotor formed with an annular magnet rotating about said stator coil, and each said detecting element is a Hall element which varies an output signal thereof in response to a magnetic field change caused by rotation of said rotor.

4. A vehicle headlamp device according to claim 3, wherein the annular magnet having two magnetic poles arrayed at 180° of the center angle, and three Hall elements are arrayed at an angular interval of 120°.

5. A vehicle headlamp device according to claim 1, wherein said drive motor is a brushless motor including a stator coil, and a rotor formed with an annular magnet rotating about said stator coil, and each said detecting element is a Hall element which varies an output signal thereof in response to a magnetic field change caused by rotation of said rotor.

6. A vehicle headlamp device according to claim 5, wherein the annular magnet having two magnetic poles arrayed at 180° of the center angle, and three Hall elements are arrayed at an angular interval of 120°.

7. A vehicle headlamp apparatus according to claim 1, wherein the illumination optical axes of the headlamp is changed horizontally according to the steering angle of the steering wheel of the vehicle.

8. A vehicle headlamp apparatus according to claim 1, wherein the drive motor and the motor drive means are integrally accommodated as a single unit.

* * * * *